United States Patent

Denel et al.

[15] 3,701,906
[45] Oct. 31, 1972

[54] SUPERCONDUCTIVE POWER STORAGE AND RELEASE DEVICE

[72] Inventors: Jean Denel, Paris; Jacques Maldy, Wissous; Enrique Santa-Maria, Villiers-sur-Orge, all of France

[73] Assignee: Compagnie Generale D'Electricite, Paris, France

[22] Filed: Oct. 1, 1971

[21] Appl. No.: 185,620

[30] Foreign Application Priority Data

Oct. 1, 1970 France.....................7035536

[52] U.S. Cl............307/149, 336/DIG. 1, 340/173.1
[51] Int. Cl. ..............................................G11c 11/44
[58] Field of Search .307/149; 336/DIG. 1; 323/44 F; 321/8 CD; 340/173.1, 166 SC

[56] References Cited

UNITED STATES PATENTS

3,267,306  8/1966  Hassel et al................307/149
3,275,857  9/1966  Freeman et al............307/149

Primary Examiner—H. O. Jones
Assistant Examiner—William J. Smith
Attorney—Sughrue, Rothwell, Mion, Zinn & Macpeak

[57] ABSTRACT

A device for rapidly transferring energy from a superconductive storage device to a utilization device. A first switch is coupled across the superconductive device and a second switch is coupled across a secondary of a transformer comprising the superconductive device and the secondary. The utilization device is coupled across the secondary in parallel with the second switch.

8 Claims, 2 Drawing Figures

INVENTORS
JEAN DENEL
JACQUES MALDY
ENRIQUE SANTA-MARIA
BY Sughrue, Rothwell, Mion,
Zinn & Macpeak
ATTORNEYS

SUPERCONDUCTIVE POWER STORAGE AND RELEASE DEVICE

BACKGROUND OF THE INVENTION

1. Field of the Invention

This invention relates to a superconducting power storage and release device with very fast response speed.

2. Description of the Prior Art

Power storage devices in superconducting coils present zero resistance in the superconducting state and offer the possibility of easily storing considerable quantities of power in a magnetic form. It may be worthwhile to release this power in order to obtain rapid, high-power pulses. This power release must be accomplished by means of a switching device coupled to the terminals of the superconducting device. The extraction of power during the discharge is generally accomplished by means of a transformer in which the superconducting storage coil plays the role of the primary and the utilization device is coupled to the terminals of a secondary coil surrounding the storage coil. Until now, switches were superconducting coils suitable for very rapidly passing from the zero-resistance superconducting state toward the normal state having a relatively high resistance. We can arrange it so that this resistance will be greater than the impedance coupled back in the primary by the utilization resistance. In spite of this precaution, the devices described above entail the inconvenience of rapidly dissipating the escape flow energy in the resistance of the switch.

It follows from this that a very large overvoltage — which can be ten times the normal voltage — appears at the terminals of the storage coil. This overvoltage phenomenon has the inconvenience of limiting the maximum voltage which can be applied to the storage coil out of fear of breaking down the insulation agent that coats this coil.

The imperfect coupling between the primary and the secondary creates a delay in the rise of the intensity appearing at the secondary, at the moment of discharge. If the coupling were perfect, the current at the secondary would present an infinite slope and the response time would be too fast. In presently existing devices, the slope of the current at the secondary presents a finite value which entails the disadvantage of delaying the response time at the moment of the discharge of the device.

SUMMARY OF THE INVENTION

The device according to this invention makes it possible to avoid these inconveniences. In this device, in effect, it is possible to produce very high voltages and outputs while obtaining faster response times at the moment of discharge.

The purpose of the invention is a power storage and release device with a view to making the electromagnetic power pass rapdily from a superconducting coil into the utilization circuit. The device includes a superconducting storage coil with terminals connected to a first switch which is suitable for assuming a closed state with essentially zero resistance and an open state with relatively great resistance, and a secondary winding having the utilization circuit at its terminals, the secondary winding constituting a transformer with the storage coil at the primary. The device is characterized by the fact that the first switch is a slow-circuit-opening switch and that a second, fast-circuit-opening switch is arranged at the terminals of said secondary winding and of said utilization circuit.

DESCRIPTION OF THE PREFERRED EMBODIMENT

Figure 1:
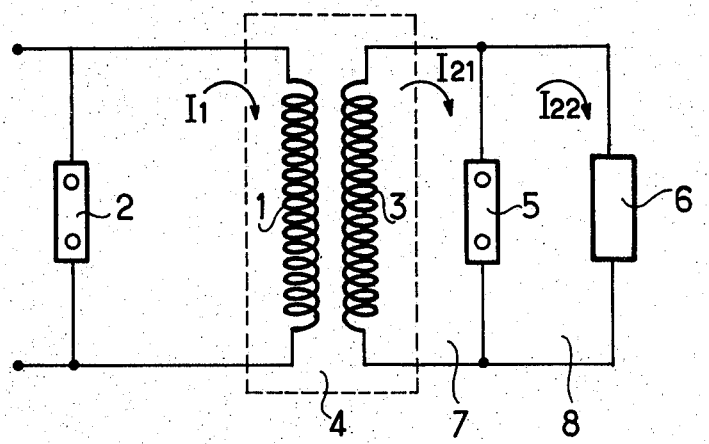
FIG. 1 shows an electrical diagram for the storage device according to the invention.

In FIG. 1, a superconducting coil 1 stores magnetic energy.

This superconducting coil 1 is short-circuited by a switch 2 which is in the closed position in the storage phase. Switch 2 is a slow-action switch. A current I1 flows through the superconducting coil 1 and the switch 2. The superconducting coil 1 can, for example, be made up of multistrand cables consisting of niobium-titanium alloy with 25 percent titanium. In one variation, a mixture of niobium-zirconium or a compound of niobium and tin can be used. A secondary winding 3 is made with non-superconducting material sheets, such as highly pure copper having a relatively low electrical resistance. A secondary winding 3 can be reduced to a single coil comprising a single copper sheet to obtain a high transformation ratio between the primary comprising the superconducting coil 1 and the secondary winding 3. The assembly of the superconducting coil 1 and secondary winding 3 is enclosed in a cryogenic enclosure 4 containing a cooling fluid, such as helium in the liquid phase. At the terminals of the secondary winding 3 is a second switch 5 and a utilization circuit 6 to obtain a high-power pulse with very rapid response speed. Switch 5 is a rapid-action switch. Utilization circuit 6 may, for example, be a laser illumination lamp.

At the moment of discharge, current I21 is circulating in the loop 7 comprising secondary winding 3 and switch 5, and a current I22 circulates in loop 8 comprising switch 5 and utilization circuit 6.

Figure 2:
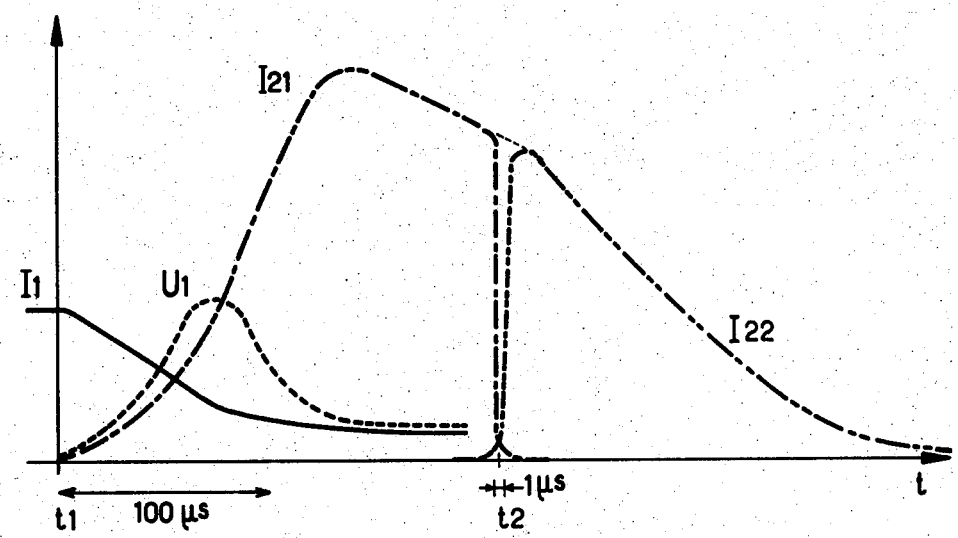
FIG. 2 shows the various voltage and current curves obtained at different points in the electrical circuit.

In FIG. 2, the axis of the abscissas represents time, the instant t1 being the opening switch 2 and the instant t2 being the opening switch 5.

The current I1, which is constant during the storage period, begins to decrease progressively, as of instant t1. The voltage U1 at the terminals of storage coil 1 presents the form of a rounded-off bell, the overvoltage at the primary having been reduced to substantially zero. The phenomenon of the absence of overvoltage at the primary is due to the slow action switch 2.

With a normal action switch, the overvoltage would exceed 10 times the maximum voltage of U1 and the edges of the curve would have much steeper sides.

As a result of the reduction of the overvoltage at the primary, the discharge voltage can be much larger and can exceed 100 kv.

Switch 2, with slow circuit opening, can be a conventional automatic circuit breaker whose resistance grows gradually as the arc is inflated by a pneumatic means. A superconducting switch may also be used in which the transition is obtained by means of a low-power pulse having a slowly rising front. This pulse is applied to a control winding outside the superconducting coil of the switch. The opening of the primary circuit may last one-hundredth microsecond.

From instant $t1$ to instant $t2$, the switch 5 is closed. The duration $t1 - t2$ is approximately equal to two one-hundredth microseconds. The current I21, which appears in the secondary winding 3, then closes again on loop 7. As a result of the slow opening of switch 2, current I21 presents a relatively gradual slope at its origin.

Current I21 grows to a maximum and then decreases slowly due to a low resistance offered by the secondary winding 3 and switch 5 in the closing state. When fast action switch 5 is open at instant $t2$, the current I21 drops to zero in about 1 microsecond, for example, and a current I22 appears in loop 8. The rising front of current I22 is steep and lasts also 1 microsecond. After passage through a maximum, current I22 decreases as a result of the discharge of energy into the utilization circuit 6. The device thereby obtains an increase in the establishment speed of current I22 in actual use, which is due to the fast action switch 5.

Fast action switch 5 may be a suitably dimensioned fuse element whose fusion is obtained after the opening of switch 2. The response curve of the resistance offered by switch 5, compared to its inertia integral, must present a steep slope. An insulating material, such as silica or oil, is necessary to extinguish the arc once it has been started.

Switch 5 can also be an explosive switch. A hammer, controlled by a gaseous explosive, strikes a previously cut copper bar and causes it to shear.

The switch 5 can also be a superconducting switch controlled by a high power pulse with a rapidly rising front.

In order to obtain a good yield, the circuit constants must obey certain rules.

The resistance of utilization circuit 6 must be very much smaller than the equivalent resistance of the secondary circuit made up of a resistance of open switch 5 and of the resistance coupled back to the secondary by the first switch 2.

The time constant of the second switch, which is closed upon itself (depending upon the inductance of the secondary winding 3, the resistance of closed switch 5 and the resistance of this winding 3) must be greater than the time of opening the primary switch, for example, 10 times.

Although the device just described may appear to be most advantageous here, we will understand that various modifications can be made in it without going beyond the framework of the invention, certain elements of the device being capable of being replaced by other suitable ones that can perform the same technical function.

The device involved in this invention may be used in all cases where discharge energy must be obtained in the shortest period of time possible.

The particularly worthwhile applications may be found in the field of plasma discharges and in laser lightning lamps.

While the invention has been particularly shown and described with reference to preferred embodiments thereof, it will be understood by those skilled in the art that various changes in form and details may be made therein without departing from the spirit and scope of the invention.

We claim:

1. An energy storage and release device for the rapid transfer of electromagnetic energy to a utilization device comprising:
    a. superconducting storage means for storing said electromagnetic energy, said superconducting storage means forming the primary of a transformer;
    b. first switch means coupled across the terminals of said superconducting storage means, said first switch means having substantially zero resistance in its closed state and a high resistance in its open state wherein said first switch means is a slow circuit opening switch;
    c. secondary winding means for forming the secondary of said transformer, said secondary winding means being coupled to said utilization device; and
    d. second switch means coupled across the terminals of said secondary winding means in parallel with said utilization device wherein said second switch means is a fast circuit opening switch and wherein said first switch means opens before said second switch means such that the energy stored in said superconducting storage means is rapidly transferred to said utilization device.

2. The energy storage and release device as set forth in claim 1 wherein said first switch means comprises an arc circuit breaker with a resistance which initially changes slowly.

3. The energy storage and release device as set forth in claim 1 wherein said first switch means comprises a superconducting switch means for receiving a control pulse having a slowly rising front.

4. The energy storage and release device as set forth in claim 1 wherein said second switch means comprises a fuse element having a resistance with a steep slope with respect to the inertia integral.

5. The energy storage and release device as set forth in claim 1 wherein said second switch means comprises an explosive switch.

6. The energy storage and release device as set forth in claim 1 wherein said second switch means is a superconducting switch means for receiving a high power control pulse having a rapidly rising front.

7. The energy storage and release device as set forth in claim 1 wherein said first switch means remains open for a time period in the order of one one-hundredth microsecond.

8. The energy storage and release device as set forth in claim 1 wherein the time period between the opening of the first switch means and the second switch means is equal to twice the time period that the first switch means is open.

* * * * *